(12) United States Patent
Hsia

(10) Patent No.: US 6,499,749 B2
(45) Date of Patent: Dec. 31, 2002

(54) INFLATABLE STROLLER WHEEL ARRANGEMENT

(76) Inventor: Ben M. Hsia, 19401 Business Center Dr., Northridge, CA (US) 91324

(*) Notice: Subject to any disclaimer, the term of this patent is extended or adjusted under 35 U.S.C. 154(b) by 0 days.

(21) Appl. No.: 09/844,652

(22) Filed: Apr. 27, 2001

(65) Prior Publication Data

US 2002/0158436 A1 Oct. 31, 2002

(51) Int. Cl.⁷ .............................. B62B 11/00; B60C 5/04
(52) U.S. Cl. ................... 280/47.38; 280/658; 280/642; 152/415; 152/510
(58) Field of Search .......................... 280/47.38, 47.4, 280/642, 647, 650, 658; 16/19, 44, 34; 152/415, 510

(56) References Cited

U.S. PATENT DOCUMENTS

| | | | | |
|---|---|---|---|---|
| 2,738,542 A | * | 3/1956 | Clark, Jr. ....................... | 16/44 |
| 4,257,651 A | * | 3/1981 | Griffith, Jr. ............ | 29/894.332 |
| 4,585,044 A | * | 4/1986 | Carrera et al. .............. | 152/165 |
| 4,828,280 A | * | 5/1989 | Kies ........................ | 280/12.14 |
| 4,858,947 A | * | 8/1989 | Yee et al. ................. | 280/47.35 |
| 4,913,452 A | * | 4/1990 | Zun .............................. | 16/30 |
| 5,029,891 A | * | 7/1991 | Jacobs ..................... | 280/47.38 |
| 5,103,530 A | * | 4/1992 | Andrisin et al. ............... | 16/20 |
| 5,119,856 A | * | 6/1992 | Zarotti ....................... | 152/415 |
| 5,172,451 A | * | 12/1992 | Chiu ............................. | 16/29 |
| 5,257,799 A | * | 11/1993 | Cone et al. ............. | 280/47.36 |
| 5,581,843 A | * | 12/1996 | Purnell ....................... | 16/35 R |
| 5,746,850 A | * | 5/1998 | Luscher et al. .......... | 152/339.1 |
| D407,673 S | * | 4/1999 | Kiser ........................ | D12/136 |
| 5,951,081 A | * | 9/1999 | Foster et al. ............... | 295/36.1 |
| 6,203,054 B1 | * | 3/2001 | Matsumoto .............. | 280/47.38 |
| 6,279,199 B1 | * | 8/2001 | Plate ............................. | 16/19 |

FOREIGN PATENT DOCUMENTS

| | | | | |
|---|---|---|---|---|
| GB | 2341153 A | * | 3/2000 | |
| WO | WO-9826971 | * | 6/1998 | |

OTHER PUBLICATIONS

Page on Bertini Sport Stroller by Dandelion www.dandelionkids.com/bsport.html, 2001.*

* cited by examiner

Primary Examiner—Matthew C. Graham
Assistant Examiner—Melody M. Burch
(74) Attorney, Agent, or Firm—Raymond Y. Chan; David & Raymond Patent Group

(57) ABSTRACT

An inflatable stroller wheel arrangement incorporated with a stroller includes a pair of driving wheel assemblies rotatably attached to two bottom portions of two first leg frames of the stroller respectively and a pair of steering wheel assemblies rotatably and coaxially attached to two bottom ends of two second leg frames of the stroller respectively. Each steering wheel assembly includes a wheel axle, a coupling hub for rotatably coupling the respective second leg frame with the wheel axle, and a pair of steering wheels rotatable mounted on two ends of the wheel axle. Each steering wheel includes rim frame having a stem hole coaxially mounted on the end of the wheel axle, a wheel tire encirclingly mounted on the rim frame, and an inflatable bladder received in the wheel tire having a valve stem extended to an exterior of the rim frame through the stem hole.

7 Claims, 4 Drawing Sheets ated with an inflatable stroller wheel arrangement 2 according to a preferred embodiment of the present invention is illustrated. The stroller 1, such as a standard stroller, comprises a supporting frame 11 having a pair of first leg frames 111 and a pair of second leg frames 112, and a seat frame 12 having a seat fabric supported by the first and second leg frames 111, 112.

INFLATABLE STROLLER WHEEL ARRANGEMENT

BACKGROUND OF THE PRESENT INVENTION

1. Field of Invention

The present invention relates to strollers, and more particularly to an inflatable stroller wheel arrangement which is adapted for enhancing a gripping force between the tire and the ground so as to prevent the stroller from being skid accidentally.

2. Description of Related Arts

Stroller, which is becomes a necessity to every family having a young child or baby, is consider as a conveniences tool to carry the baby or young child during outdoor activities such as foot traveling and shopping.

A conventional stroller comprises a front frame comprising a pair of front supporting posts and a U-shaped handle having two ends respectively connected to two top ends of the pair front supporting posts, a back frame comprising a U-shaped back supporting stem having two ends upwardly extended thereof pivotally connected with the front frame by means of a pair of pivot joints, a pair of front wheels rotatably mounted on bottom ends of the pair of front supporting post respectively, a pair of back wheels rotatably mounted on a bottom of the back supporting stem, a seat frame, which comprises a pair of parallel seat supporting bars, mounted between the front frame and the back frame for supporting a baby to place thereon, and a pair of folding joints for connecting the pair of front supporting posts and the two ends of handle together to form the rigid front frame, wherein by operating the folding joints, the handle can be folded rearwardly and downwardly towards the back frame, so as to fold up the stroller to reduce its size.

However, the conventional stroller has a major drawback that the front and rear wheels are considered disadvantageous in practical use. Since the wheels are made of foaming material, the wheels are reduced their elasticity in such a manner that a shock from each wheel will directly transfer to the entire stroller when driving on the ground. So, the baby may feel uncomfortable and unsafe when the stroller is shaking. The shock on the wheels may render the stroller losing its balance and turning over. Thus, the foam made wheels fail to grip on the ground such that the stroller is easy to skid especially on the slippery road. Since the baby is soft and weak, any mistake may cause unwanted injury to the baby.

SUMMARY OF THE PRESENT INVENTION

A main object of the present invention is to provide an inflatable stroller wheel arrangement which enhances the performance and endurance of the wheel for the stroller.

Another object of the present invention is to provide an inflatable stroller wheel arrangement which is adapted for enhancing a gripping force between the tire and the ground so as to prevent the stroller from being skid accidentally.

Another object of the present invention is to provide an inflatable stroller wheel arrangement which increases a cushion effect by the steering wheel assemblies so as to enhance the comfortability of the stroller.

Another object of the present invention is to provide an inflatable stroller wheel arrangement wherein the tire is made of rubber which is durable for prolonging the service life span of the stroller while being cost effective.

Another object of the present invention is to provide an inflatable stroller wheel arrangement which does not require to alter the original structural design of the stroller, so as to minimize the manufacturing cost for incorporating the inflatable stroller wheel arrangement with every conventional stroller.

Accordingly, in order to accomplish the above objects, the present invention provides a stroller, comprising:

a supporting frame having a pair of first leg frames and a pair of second leg frames;

a seat frame having a seat fabric supported by the first and second leg frames; and an inflatable stroller wheel arrangement comprising:

a pair of driving wheel assemblies rotatably attached to two bottom portions of the first leg frames respectively for driving the stroller in a frontward and a backward directions; and a pair of steering wheel assemblies rotatably and coaxially attached to two bottom ends of the second leg frames respectively for steering a direction of the stroller wherein each of the steering wheel assemblies comprises a wheel axle, a coupling hub for rotatably coupling the respective second leg frame with the wheel axle, and a pair of steering wheels rotatably mounted on two ends of the wheel axle;

wherein each of the steering wheels comprises rim frame having a stem hole coaxially mounted on the end of the wheel axle, a wheel tire encircling mounted on the rim frame, and an inflatable bladder received in the wheel tire comprising a valve stem extended to an exterior of the rim through the stem hole.

DETAILED DESCRIPTION OF THE PREFERRED EMBODIMENT

Figure 1:
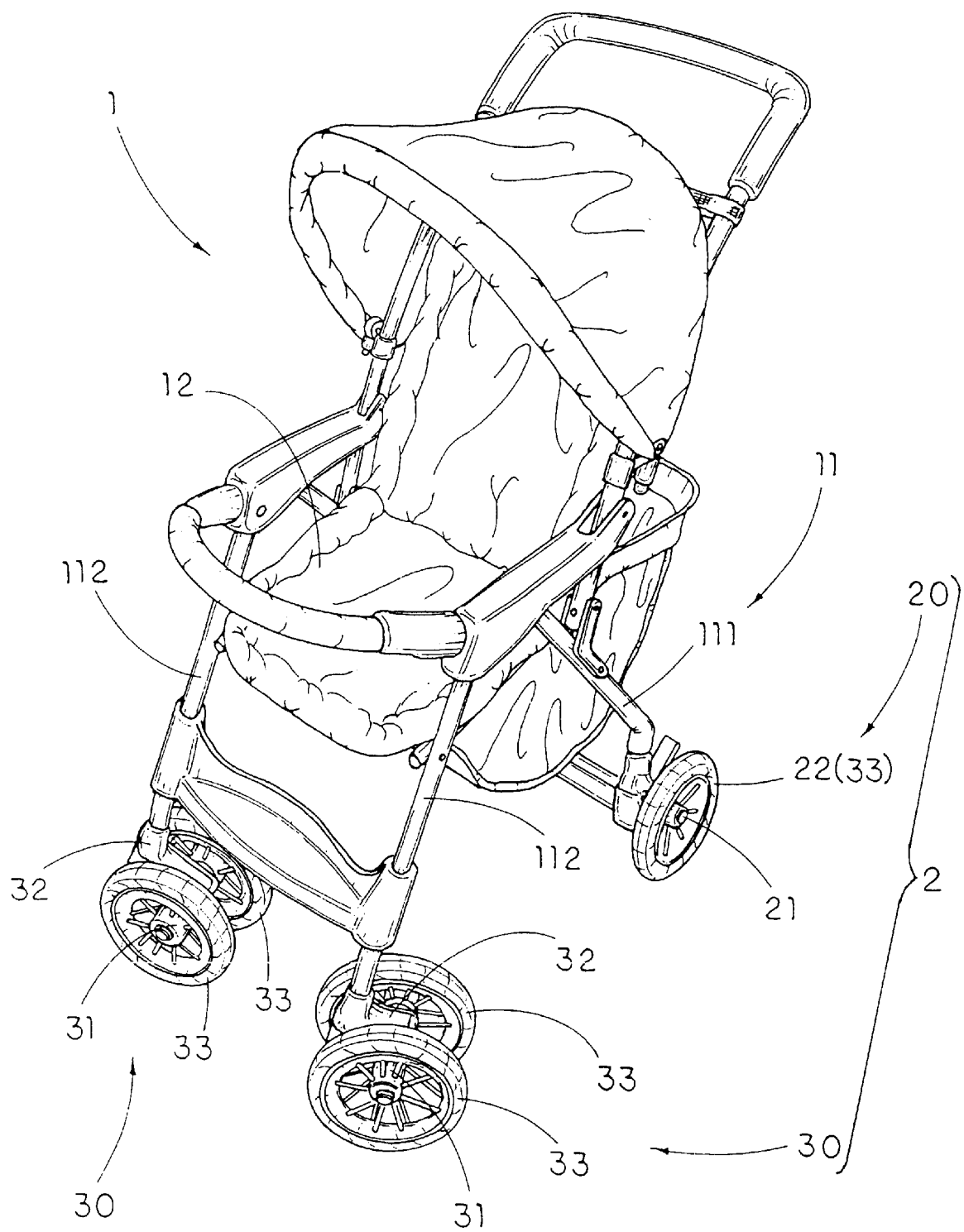
FIG. 1 is a perspective view of a stroller incorporated with an inflatable stroller wheel arrangement according to a preferred embodiment of the present invention.

Referring to FIG. 1 of the drawings, a stroller 1 incorporated with an inflatable stroller wheel arrangement 2 according to a preferred embodiment of the present invention is illustrated. The stroller 1, such as a standard stroller, comprises a supporting frame 11 having a pair of first leg frames 111 and a pair of second leg frames 112, and a seat frame 12 having a seat fabric supported by the first and second leg frames 111, 112.

The inflatable stroller wheel arrangement 2 comprises a pair of driving wheel assemblies 20 rotatably attached to two bottom portions of the first leg frames 111 respectively and a pair of steering wheel assemblies 30 rotatably attached to two bottom ends of the second leg frames 112 respectively.

Figure 2:
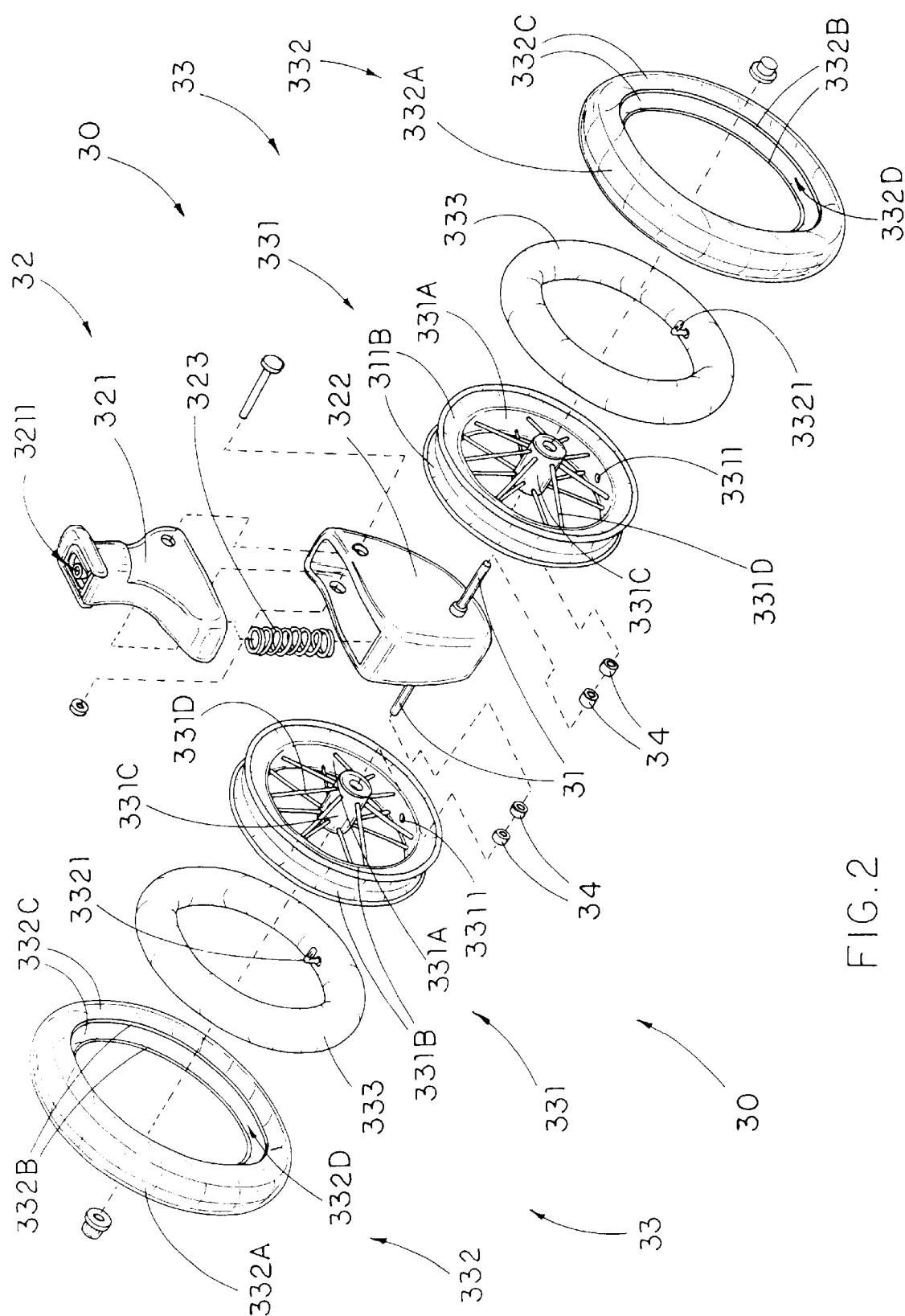
FIG. 2 is an exploded perspective view of the inflatable stroller wheel arrangement according to the above preferred embodiment of the present invention.
Figure 3:
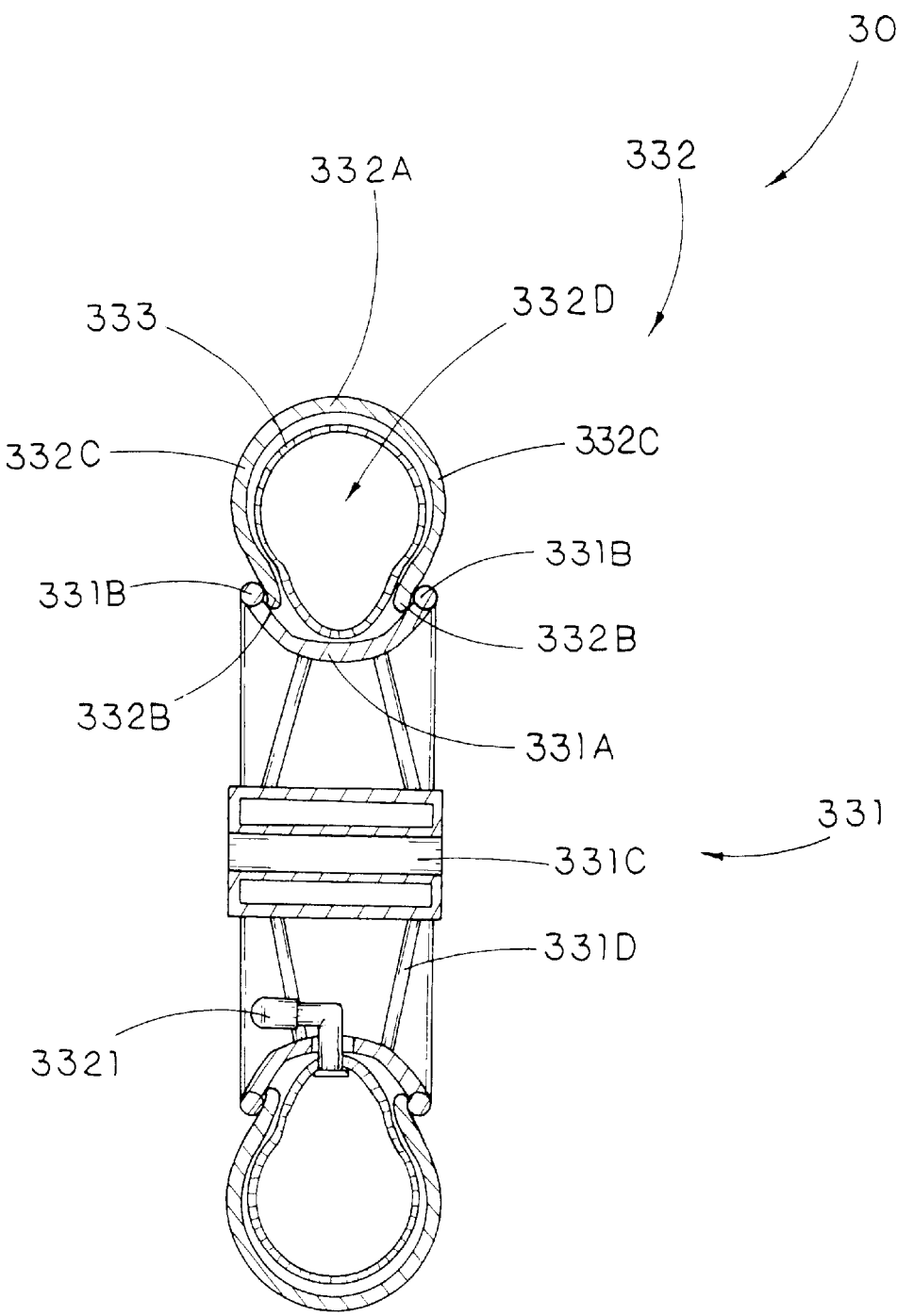
FIG. 3 is a sectional view of the wheel of the inflatable stroller wheel arrangement according to the above preferred embodiment of the present invention.

As shown in FIGS. 2 and 3, each of the steering wheel assemblies 30 comprises a wheel axle 31, a coupling hub 32 for rotatably coupling the respective second leg frame 112 with the wheel axle 31, and a pair of steering wheels 33 rotatably mounted on two ends of the wheel axle 31.

Each of the steering wheels 33 comprises rim frame 331 having a stem hole 3311 coaxially mounted on the end of the wheel axle 31, a wheel tire 332 encirclingly mounted on the rim frame 331, and an inflatable bladder 333 received in the wheel tire 332 comprising a valve stem 3321 extended to an exterior of the rim frame 331 through the stem hole 3311.

The rim frame 331, which is made of rigid material such as metal, comprises a base 331a generally having a cylindrical shape, a pair of bead seats 331b axially and spacedly extended from two circumferences of the base 331a, a central hub 331c rotatably connected to the wheel axle 31, and a plurality of spokes 331d supportively extended between the base 331a and the central hub 331c.

The wheel tire 332, which is a pneumatic tire made of rubber, generally having a U-shaped cross section has a tread 332a, a pair of bead segments 332b axially spaced apart, and a pair of sidewalls 332c extended between the tread 332a and the bead segments 332b respectively wherein a tire cavity 332d is defined between the two sidewalls 332c. The wheel tire 332 is adapted to coaxially mount on the rim frame 331 wherein the two bead segments 332b are biased against two inner sides of the bead seats 331b respectively.

The inflatable bladder 333 having a stretchable properties received in the tire cavity 332d wherein the inflatable bladder 333 is arranged in such a manner when gas is pumped into the inflatable bladder 333, the inflatable bladder 333 is inflated to bias against the rim frame 331 and the wheel tire 332 so as to retain a predetermined inflation pressure of the wheel tire 332, as shown in FIG. 3.

It is worth to mention that when the inflation pressure is reduced, the tension of the wheel tire 332 will be reduced, so as to reduce the load carrying capability of the wheel tire 332. So, the inflatable bladder 333 is capably of maintaining the inflation pressure of the wheel tire 332 to enhance the endurance of the wheel tire 332. Thus, air is one of the best shock absorbing material such that the steering wheel assemblies 30 can increase a cushion effect thereof so as to enhance the comfortability of the stroller 1.

Each of the driving wheel assemblies 20 comprises a driving axle 21 extended from the bottom portion of the respective first leg frame 111 and a driving wheel 22 rotatably attached to a free end of the driving axle 21. The driving wheel 22, which has the same structure of the steering wheel 33, is adapted for rotatably driving the stroller 1 in a frontward and a backward direction. In other words, two steering wheels 33 are rotatably attached to the driving axles 21 extended from the bottom portion of the respective first leg frame 111 for driving the stroller 1 frontwardly and backwardly.

According to the preferred embodiment, the coupling hub 32 of the steering wheel assembly 30 comprises a first hub body 321 having an engaging socket 3211 for the bottom end of the second leg frame 112 rotatably and detachably inserting thereinto and a second hub body 322, which is extended from the first hub body 321, having a transverse axle hole 3221 for the wheel axle 31 rotatably passing therethrough. In other words, each steering wheel assembly 30 is coaxially and rotatably attached to the second leg frame 112 at 360 degrees for steering a direction of the stroller 1.

Figure 4:
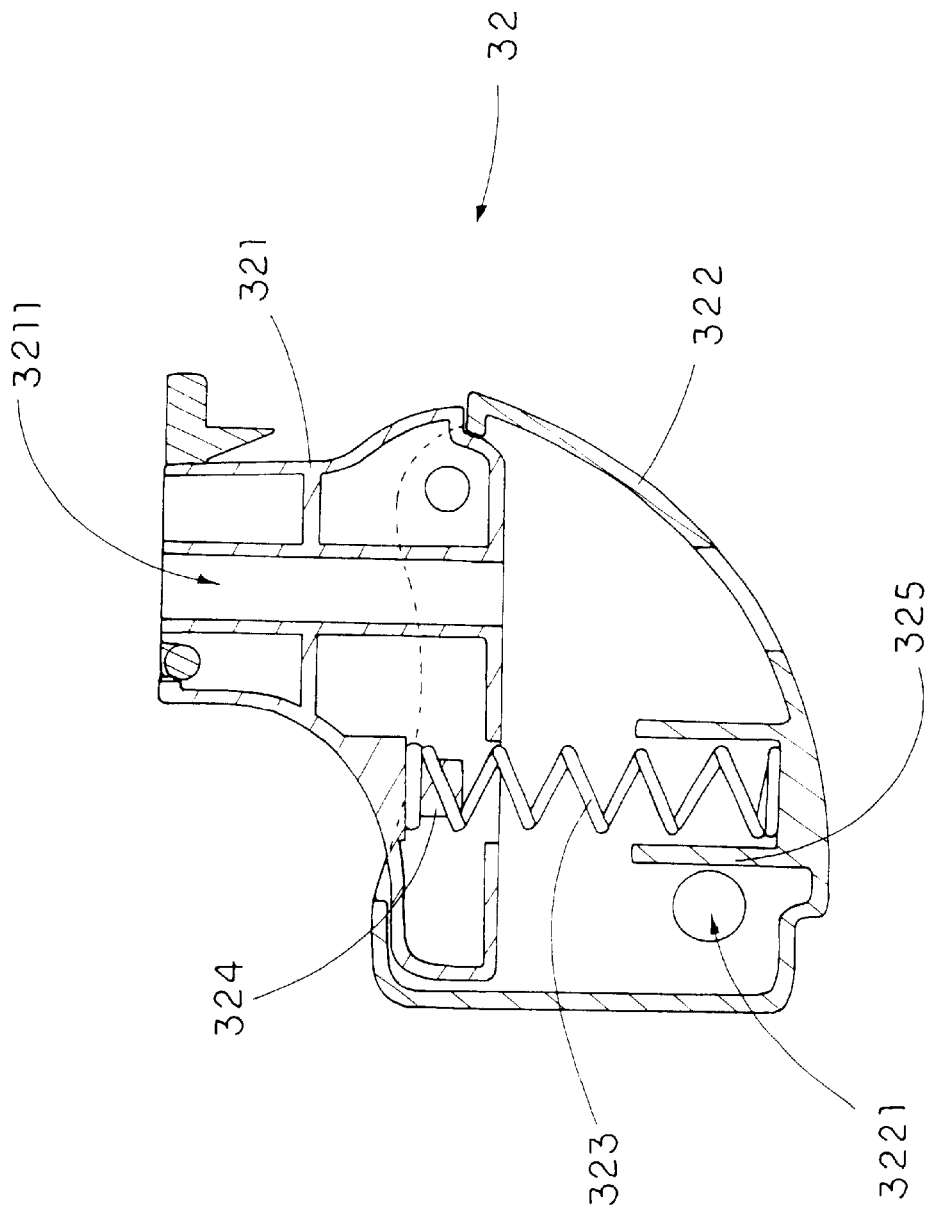
FIG. 4 is a sectional view of a coupling hub of the inflatable stroller wheel arrangement according to the above preferred embodiment of the present invention.

As shown in FIGS. 2 and 4, the first hub body 321 is pivotally connected to the second hub body 322 wherein a resilient element 323 is provided between the first hub body 321 and the second hub body 322 for applying an urging pressure against the first hub body 321, so as to urge the first hub body 321 pivotally moved away from the second hub body 322. Accordingly, the resilient element 323 is a compression spring having two ends biasing against a ceiling of thee first hub body 321 and a bottom wall of the second hub body 322 respectively, so as to function as a shock absorbent for the stroller 1. In other words, the shock generated from the steering wheels 33 will be partially absorbed by the resilient element 323 in order to enhance the comfortability of the stroller 1.

The coupling hub 32 further comprises a first holder 324 downwardly protruded from the ceiling of the first hub body 321 and a second holder 325 upwardly protruded from the bottom wall of the second of the second hub body 322 wherein the first holder 324 and the second holder 325 are adapted for engaging to a top and a bottom end of the resilient element 323 respectively, so as to secure the two ends of the resilient element 323 to bias against the first hub body 321 and the second hub body 322 respectively. According to the preferred embodiment, the first holder 324 having a rod-like shape is adapted for inserting into the top end of the resilient element 323 and the second holder 325 having a socket is adapted for the bottom end of the resilient element 323 inserting thereinto.

As shown in FIG. 2, the steering wheel assembly 30 further comprises at least a pair of ring-shaped guiders 34 each having a predetermined width rotatably and coaxially mounted on the wheel axle 31 between the coupling hub 32 and the steering wheel 33 for providing a clearance therebetween.

What is claimed is:

1. A stroller, comprising:
    a supporting frame having a pair of first leg frames and a pair of second leg frames;
    a seat frame, having a seat fabric being supported by said first and second leg frames; and
    an inflatable stroller wheel arrangement comprising:
        a pair of driving wheel assemblies rotatably attached to two bottom portions of said first leg frames respectively for driving the stroller in a frontward direction and a backward direction; and
        a pair of steering wheel assemblies rotatably and coaxially attached to two bottom ends of said second leg frames respectively for steering a direction of said stroller, wherein each of said steering wheel assemblies comprises a wheel axle, a coupling hub for rotatably coupling one of said second leg frames with said wheel axle, wherein each of said steering wheels comprises a rim frame which has a stem hole and is coaxially mounted on one of said ends of said wheel axle, a wheel tire encirclingly mounted on said rim frame, and an inflatable bladder received in said wheel tire comprising a valve stem extended to an exterior of said rim frame through said stem hole, wherein said coupling hub of each of said bottom end of one of said second leg frames rotatably and detachably inserting thereinto and a second hub body, which is extended from said first hub body, having a transverse axle hole for one of said wheel axles rotatably passing therethrough, wherein said first hub body is pivotally connected to said second hub body wherein a resilient element is provided between said first hub body and said second hub body for applying an urging pressure against said first hub body, so as to urge said first hub body pivotally moved away from said second hub body.

2. A stroller, as recited in claim 1, wherein said resilient element is a compression spring having two ends biasing against a ceiling of said first hub body and a bottom wall of said second hub body respectively, so as to absorb a shock from said steering wheel assembly.

3. A stroller, as recited in claim 2, wherein said coupling hub further comprises a first holder downwardly protruded from said ceiling of said first hub body and a second holder upwardly protruded from said bottom wall of said second hub body wherein said first holder and said second holder are adapted for engaging to a top and a bottom end of said resilient element respectively, so as to secure said two ends of said resilient element to bias against said first hub body and said second hub body respectively.

4. A stroller, comprising:

a supporting frame having a pair of first leg frames and a pair of second leg frames;

a seat frame, having a seat fabric, being supported by said first and second leg frames; and an inflatable stroller wheel arrangement comprising:

a pair of driving wheel assemblies rotatable attached to two bottom portions of said first leg frames respectively for driving the stroller in a frontward and a backward directions; and a pair of steering wheel assemblies rotatably and coaxially attached to two bottom ends of said second leg frames receptively for steering a direction of said stroller wherein each of said steering wheel assemblies comprises a wheel axle, a coupling hub for rotatably coupling one of said second leg frames with said wheel axle, and a pair of steering wheels rotatably mounted on tow ends of said wheel axle, wherein each of said steering wheels comprises a rim frame which has a stem hole and is coaxially mounted on one of said ends of said wheel axle, a wheel tire encirclingly mounted on said rim frame, and an inflatable bladder received in said wheel tire comprising a valve stem extended to an exterior of said rim frame through said stem hole, wherein said rim frame comprises a base generally having a cylindrical shaped and a pair of bead seats axially spacedly extended from two circumferences of said base, and wherein said wheel tire generally having a U-shaped cross section has a tread, a pair of bead segments axially spaced apart, and a pair of sidewalls extended between said tread and said bead segments respectively, wherein a tire cavity is defined between said two sidewalls and said wheel tire is adapted to coaxially mount on said rim frame, wherein said two bead segments are biased against two inner sides of said bead seats respectively, wherein said inflatable bladder, having a stretchable property, is received in said tire cavity and arranged in such a manner when gas is pumped into said inflatable bladder, said inflatable bladder is inflated to bias against said rim frame and said wheel tire so as to retain a predetermined inflation pressure of said wheel tire, wherein said rim frame further comprises a central hub rotatably connected to said wheel axle and a plurality of spokes supportively extended between said base and said central hub, wherein each of said driving wheel assemblies comprises a driving axle extended from the bottom portion of the respective first leg frame and said steering wheel rotatably attached to a free end of said driving axle, wherein said coupling hub of each of said steering wheel assemblies comprises a first hub body having an engaging socket for said bottom end of one of said second leg frames rotatably and detachably inserting thereinto and a second hub body, which is extended from said first hub body, having a transverse axle hole for one of said wheel axles rotatably passing therethrough, wherein said first hub body is pivotally connected to said second hub body wherein a resilient element is provided between said first hub body and said second hub body for applying an urging pressure against said first hub body.

5. A stroller, as recited in claim 4, wherein said resilient element is a compression spring having two ends biasing against a ceiling of said first hub body and a bottom wall of said second hub body respectively, so as to absorb a shock from said steering wheel assembly.

6. A stroller, as recited in claim 5, wherein said coupling hub further comprises a first holder downwardly protruded from said ceiling of said first hub body and a second holder upwardly protruded from said bottom wall of said second hub body wherein said first holder and said second holder are adapted for engaging to a top and a bottom end of said resilient element respectively, so as to secure said two ends of said resilient element to bias against said first hub body and said second hub body respectively.

7. A stroller, as recited in claim 6, wherein each of said steering wheel assemblies further comprises at least a pair of ring-shaped guiders each having a predetermined width rotatably and coaxially mounted on one of said wheel axles between said coupling hub and said steering wheel for providing a clearance therebetween.

* * * * *